D. GARST.
MEANS FOR CLEARING THE SURFACE OF DIRT WORKING TOOLS.
APPLICATION FILED SEPT. 8, 1913.

1,122,584. Patented Dec. 29, 1914.

Witnesses
Chas. W. Stauffiger
Anna M. Dorr

Inventor
Dudley Garst,
By
Attorneys

UNITED STATES PATENT OFFICE.

DUDLEY GARST, OF WATERLOO, IOWA.

MEANS FOR CLEARING THE SURFACE OF DIRT-WORKING TOOLS.

1,122,584. Specification of Letters Patent. Patented Dec. 29, 1914.

Application filed September 8, 1913. Serial No. 788,531.

*To all whom it may concern:*

Be it known that I, DUDLEY GARST, a citizen of the United States of America, residing at Waterloo, in the county of Blackhawk and State of Iowa, have invented certain new and useful Improvements in Means for Clearing the Surface of Dirt-Working Tools, of which the following is a specification, reference being had therein to the accompanying drawings.

In the use of shovels, scrapers, plows and the like in soils that are commonly known as gumbo, or where the loam or other dirt has certain tendencies to clog and to stick to any metal that is inserted, it is extremely difficult to keep the cleaving, cutting or turning surface of the tool in the properly cleaned and polished condition. Various expedients have been used without success to prevent this, the metal being highly polished, a lubricant being poured upon it as it is drawn through or inserted in the soil, and various other devices of like character being tried without obtaining the necessary results. Especially in the use of plows, the failure of the mold board to scour itself prevents it from performing its usual function and the soil through which it is drawn, instead of being turned over, is simply pushed one side, thereby preventing anything like the proper plowing.

This invention relates to means for clearing the surface of any dirt working tool, such as a plow, scraper, or the like and to an arrangement thereof whereby it is especially adaptable for plows and similar implements used in the cultivation, handling or tilling of what is known as gumbo soil and the like.

The invention consists in the matters hereinafter set forth, and more particularly pointed out in the appended claims.

Figure 1:
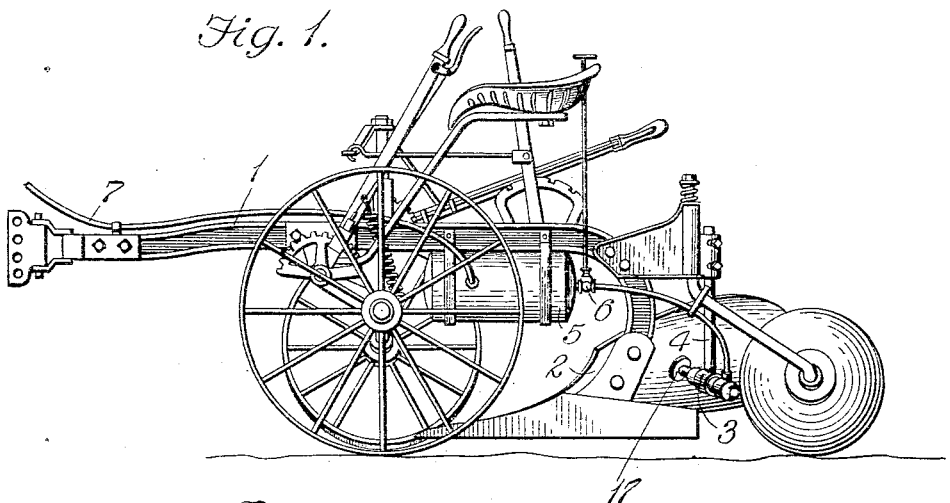
Figure 3:
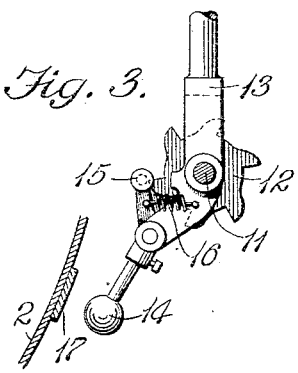
Figure 2:
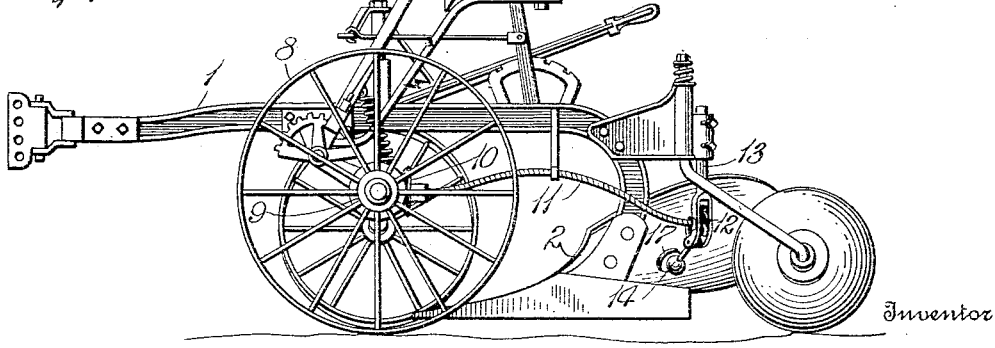

In the drawings, Figure 1 is a view in side elevation of a plow provided with means that embody features of the invention; Fig. 2 is a similar view of a plow provided with a modification of the invention; Fig. 3 is a view in detail of one form of operating mechanism.

Referring to the drawings, a plow 1 of ordinary riding type or of the so-called sulky design, arranged to be drawn by a tractor or team, has a plow share 2 or several of them as in a gang plow, of conventional or standard design. A tapping member 3 is operatively mounted as in a suitable hanger 4 to strike the rear surface of the plow share at a point that is determined largely by the particular form and material of the latter. Preferably the tapper consists of a shaft operated as in an ordinary chipping or riveting machine driven by air, the particular mechanism of the latter not being in itself a part of the invention. An air tube or supply pipe leads either to an air reservoir 5 through a controlling valve 6 or directly to some other source of compressed air. As indicated in Fig. 1 the reservoir may be supplied from a pipe 7 leading forward to a compressor, not shown, on whatever tractor is employed. It is to be understood that the hanger is so disposed that the tapping member may be adjusted to the most effective position.

When it is not convenient to operate the tapper by compressed air it may be driven by one of the traction bearing wheels 8 of the plow. As indicated in Figs. 2 and 3, a bevel gear 9 on the wheel may be geared through a pinion 10 to a flexible shaft 11 that rotates a tappet or ratchet wheel 12 mounted in a suitable hanger 13 behind the plow share. A weighted rock arm or hammer 14 forms one end of a bell crank whose other end portion is provided with a roller 15 that is projected by the tappet wheel 12 against the action of a suitable recoil spring 16 by which it is snapped back so that the hammer 14 retracts sharply against the plow shaft. As a detail of construction an anvil plate 17 may be formed on or secured to the under face of the plow share to receive the blows of the tapping member. Obviously any form of driving connection for causing the tapping tool to operate properly may be employed if desired.

In operation, the vibration of the plow share by the concussion of the tapping tool, prevents any dirt or soil lodging thereon. This keeps the plow share in such condition that the mold board turns the soil over in the proper manner, the plow scours itself and operates as readily as in sandy soil. Similarly, the tapper may be applied to a steam shovel, or other like tool in which the soil tends to cling to one of the surfaces when the tool is forced therethrough and as its application is by a suitable arrangement of the adjusting hangers, the other forms of tools with such attachment added have not been shown herein.

Obviously, changes in the details of construction may be made without departing from the spirit of my invention and I do not care to limit myself to any particular form or arrangement of parts.

What I claim as my invention is:—

1. The combination with an implement adapted to cleave through earth, of means for setting up vibrations therein by concussion.

2. The combination with an earth handling implement, of means for tapping the implement back of the surface traversed by the soil when the implement is passing therethrough.

3. The combination with a plow, of a tapping member, means for securing the tapping member to strike against the rear face of the plow share to set up vibrations therein, and means for operating the tapping member.

In testimony whereof I affix my signature in presence of two witnesses.

DUDLEY GARST.

Witnesses:
ANNA M. DORR,
C. R. STICKNEY.

Copies of this patent may be obtained for five cents each, by addressing the "Commissioner of Patents, Washington, D. C."